(12) United States Patent
Gillet et al.

(10) Patent No.: US 6,895,950 B2
(45) Date of Patent: May 24, 2005

(54) CROSSBOW-TYPE UNDERWATER GUN COMPRISING A STRETCHING DEVICE

(76) Inventors: Jean-Claude Gillet, Rosu Marinu 13A, 20137 Porto Vecchio (FR); Jacques Leroux, Capo di Stelle, 20135 Conca (FR)

( * ) Notice: Subject to any disclaimer, the term of this patent is extended or adjusted under 35 U.S.C. 154(b) by 0 days.

(21) Appl. No.: 10/451,895

(22) PCT Filed: Jan. 2, 2001

(86) PCT No.: PCT/FR01/00008
§ 371 (c)(1),
(2), (4) Date: Jun. 26, 2003

(87) PCT Pub. No.: WO02/052932
PCT Pub. Date: Jul. 11, 2002

(65) Prior Publication Data
US 2004/0074484 A1 Apr. 22, 2004

(51) Int. Cl.$^7$ .................................................. F41B 3/00
(52) U.S. Cl. ............................ 124/22; 124/20.3; 124/25
(58) Field of Search ............................ 124/20.3, 22, 25

(56) References Cited

U.S. PATENT DOCUMENTS

| 4,719,897 A | * | 1/1988 | Gaudreau | 124/25 |
| 4,827,894 A | * | 5/1989 | Schallberger | 124/25 |
| 4,942,861 A | * | 7/1990 | Bozek | 124/25 |
| 5,215,069 A | * | 6/1993 | Liu | 124/25 |
| 5,749,348 A | * | 5/1998 | Oviedo-Reyes | 124/25 |
| 5,823,172 A | * | 10/1998 | Suggitt | 124/25 |
| 5,931,145 A | * | 8/1999 | Oviedo-Reyes | 124/20.3 |
| 6,286,496 B1 | * | 9/2001 | Bednar | 124/25 |

FOREIGN PATENT DOCUMENTS

| FR | 2758623 | 1/1997 |
| FR | 2758878 | 1/1997 |
| FR | 2781980 | 6/1999 |

* cited by examiner

Primary Examiner—John A. Ricci
(74) Attorney, Agent, or Firm—Cohen, Pontani, Liberman & Pavane

(57) ABSTRACT

A crossbow-type underwater gun having resilient propulsion comprising at least two bungee type side resilient cords (8), the gun being characterized in that it includes a device for stretching the resilient cords (8) comprising a moving head piece (11) to which the first fixing elements ($11_1$, $11_2$) can be fixed, the head piece (11) being suitable for sliding along the front portion of the spear support element (2); and a lever arm (10) cooperating with a rod (12) via a thrust and retaining device (13, 14, 23, 24) in such a manner as to enable the resilient cords (8) to be stretched by performing a succession of pivoting actions of the lever arm (10) between an initial position (B1) and a thrusted position (B2).

9 Claims, 3 Drawing Sheets

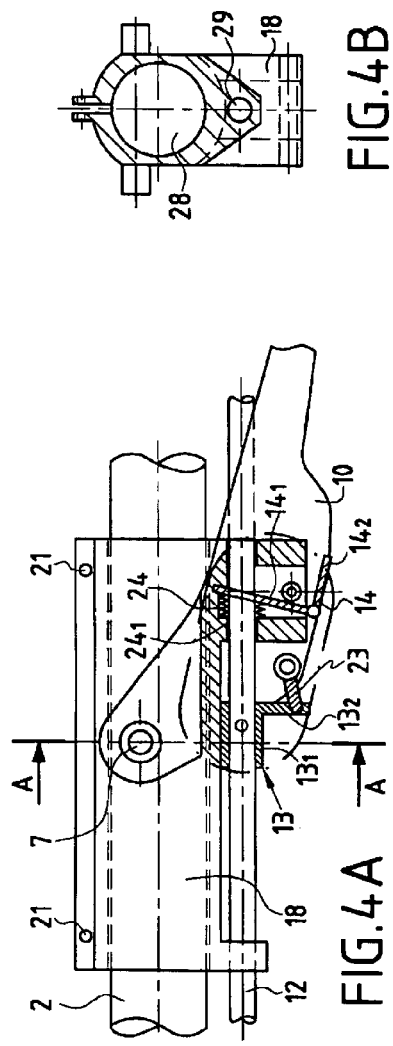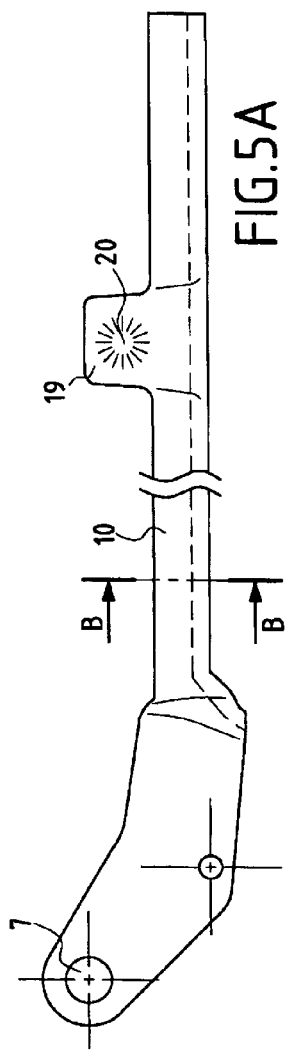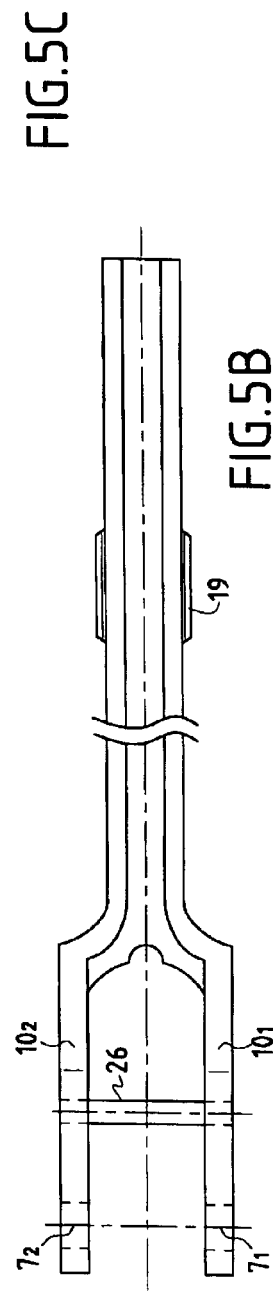

CROSSBOW-TYPE UNDERWATER GUN COMPRISING A STRETCHING DEVICE

PRIORITY CLAIM

This is a U.S. national stage of application No. PCT/FR01/00008, filed on Jan. 02, 2001. Priority is claimed on that application.

BACKGROUND OF THE INVENTION

The present invention relates to a crossbow-type underwater gun, i.e. having resilient side cords of the "bungee" type that are stretched in order to propel the spear.

In conventional manner, such guns are constituted by a butt extended by a spear-carrier tube and provided with a trigger release. The tube supports a spear propulsion mechanism constituted by two side bungees. The front ends of the bungees are fixed to a support piece which is disposed at the head end of the gun, and which also generally serves as means for guiding the spear. The rear ends of the bungees are connected together by a metal ring referred to as a "loop" for inserting in a notch formed in the rear portion of the spear, in order to propel the spear after the bungees have been stretched.

Such guns are traditionally cocked by direct application of force using both arms, stretching the bungees towards the butt, and engaging the loop in the notch in the spear. However, that operation requires a large amount of force and is not possible for all individuals, in particular with a high-power gun, i.e. a gun having a long spear-carrier tube and possibly also a plurality of side bungees. Under such circumstances, the butt needs to be pressed against the abdomen. Furthermore, there is danger of injuring the fingers if the loop is poorly engaged in a spear notch, or when releasing the bungees, not to mention the abdominal pain caused by pressure from the butt.

OBJECT AND SUMMARY OF THE INVENTION

The object of the present invention is to provide a crossbow-type underwater gun provided with a stretching device that is simple, reliable, and enables any individual, even a relatively weak person, to cock the gun in complete safety.

To do this, the present invention provides a crossbow-type underwater gun comprising:
- a butt having a mechanism for blocking the rear end of a spear and a member for unblocking said spear, preferably a trigger;
- a longitudinal spear support element whose rear end is engaged in said butt; and
- resilient propulsion means comprising at least two bungee type side resilient cords whose front ends are suitable for being fixed to fixing elements and whose rear ends are suitable for engaging in at least one notch in the rear portion of said spear.

According to the invention, the gun includes a device for stretching said resilient cords, the device comprising:
- a moving head piece to which said first fixing elements can be fixed, said head piece being suitable for sliding along the front portion of said spear support element between:
  - a rear position enabling said resilient cords to be engaged without tension in said notch; and
  - an advanced position in which said resilient cords are stretched maximally when they are engaged in said notch;
- a rod, said moving head piece being suitable for sliding along said spear support element by moving said rod in its longitudinal direction, preferably parallel to that of said longitudinal spear support element; and
- a lever arm, said lever arm co-operating with said rod via a thrust and retaining device which makes the following possible:
  - moving said rod in said longitudinal direction under drive from pivoting said lever arm;
  - holding said rod in an advanced position corresponding to the travel distance of said rod resulting from said pivoting of the lever arm, while said lever arm is returned to its initial position by being pivoted in the opposite direction; and
  - thereby enabling said resilient cords to be stretched by performing a succession of pivoting operations on said lever arm between an initial position and a thrusted position.

In a particular embodiment, said lever arm co-operates with a transverse pivot pin secured to said longitudinal spear support element, thus enabling said lever arm to pivot about said pin between:
- a high initial position in which said arm is preferably substantially parallel to the rear portion of said longitudinal spear support element and beneath it; and
- a low, thrusted position where said lever arm is in an inclined or vertical position. The term "transverse" is used herein to mean a direction extending perpendicularly to said longitudinal direction.

In practice, said pivot pin for the lever arm is situated substantially in the middle portion of the gun and is at the front end of said lever arm, which itself extends towards the rear end of the gun so that the lever arm can be pivoted downwards by being pushed downwards.

In particularly advantageous manner, the thrust and retaining device is of the mechanical type and comprises:
- a thrust piece having an orifice through which said rod passes, the orifice being of diameter substantially larger than the diameter of said rod so that said thrust piece can pivot relative to the axis of said rod between:
  - an off-axis, thrust and blocking position in which said thrust piece is secured to said rod and can entrain it forwards in said longitudinal direction under drive from pivoting said lever arm; and
  - a return position in which said rod lies on the axis of said first orifice, and said thrust piece can thus return freely to its initial position by moving rearwards in translation in said longitudinal direction;
- a retaining piece including an orifice through which said rod passes, the orifice being substantially larger in diameter than said rod such that said retaining piece can pivot relative to the axis of the rod between:
  - an off-axis, retaining and blocking position in which said retaining piece blocks the rod by preventing it from sliding rearwards in said longitudinal direction; and
  - an unblocking position in which said rod can slide freely in said longitudinal direction; and
- said retaining piece being held in said retaining and blocking position while said thrust piece is in its return position, and said retaining piece being held in said unblocking position while said rod is sliding forwards in said longitudinal direction.

By actuating said retaining piece towards the unblocking position, while the bungees are stretched and the spear is cocked, the gun is uncocked, said moving head piece being pulled rearwards by the bungees.

Preferably, said orifice of said first piece comprises an orifice in the form of a tubular element, thus constituting a blocking bearing that is more effective. Said thrust piece then includes a bottom plate on which it is possible to exert the action that leads to said tubular element pivoting.

Advantageously, the underwater gun of the invention comprises the following characteristics in which:

said lever arm is secured to said thrust piece, preferably secured to a plate of said thrust piece, by means of a link in such a manner that pivoting said lever arm causes said thrust piece to pivot, said thrust piece occupying:

a said off-axis, blocking position when said lever arm pivots from its said initial position towards its said thrusted position; and a said return position when said lever arm pivots in the opposite direction from its said thrusted position towards its said initial position; and said retaining piece is held in its said retaining position by resilient extender return means, preferably made of elastomer material, suitable for being compressed by pivoting of said retaining piece towards said unblocking position.

The thrust retaining device thus requires only one resilient return means to be provided.

It is thus by means of an alternating bracing phenomenon of the two thrust and retaining pieces that are hinged on said rod secured to said moving head piece having the bungees fixed thereto that it is possible for each operation on the lever arm to cause said thrust piece to thrust against the rod while said retaining piece retains it. Operated using one arm only, the gun can be cocked without effort, in general by a succession of 4 to 8 pivot operations.

In an embodiment, the gun presents the following characteristics, in which:

said retaining piece is L-shaped having a first plate and a second plate forming a right angle at the bottom end of said first plate;

said orifice of said retaining piece being in the top portion of said first plate;

said resilient return means being in annular form around said rod in extension between a stationary stop element and said first plate;

said resilient return means exerting thrust on said first plate, pushing it into an inclined position corresponding to said retaining position as obtained by blocking said retaining piece, the top end of said first plate preferably being inclined towards the rear of said gun; and said first plate being capable of being pivoted towards said unblocking position for unblocking said retaining piece by moving said rod forwards in said longitudinal direction and by pivoting said second plate, preferably upwards, causing said resilient return means to be compressed in both cases so that said spear can be uncocked by exerting upward pressure using a finger on said second plate.

Said stationary stop element is secured to said longitudinal element. Furthermore, it will be understood that when the rod advances under drive due to pivoting said lever arm, it compresses said resilient return means and unblocks said retaining piece.

In an embodiment, said gun includes a stationary baseplate secured to said longitudinal spear support element, said baseplate supporting said transverse pivot pin of said lever arm and the various component parts of said thrust and retaining device.

In particular, said butt contains said thrust pieces, said retaining pieces, and the various other component elements of the retaining device such as said resilient return means and said stationary stop element.

More particularly, said baseplate comprises at least one, and preferably at least two bottom orifice(s) through which said rod passes, and also preferably at least one top orifice through which said longitudinal spear support element constituting a spear-carrier tube passes.

Said orifices of said baseplate also constitute blocking bearings when the longitudinal axis of said rod is in an off-axis position.

Advantageously, said moving head piece has a first orifice through which said spear-carrier tube passes and a second orifice through which said spear passes and which serves as guide means therefor, and a hollow housing in which said rod comes into abutment to cause said moving head piece to slide forwards.

The present invention also provides a stretching device useful in making a crossbow-type underwater gun of the invention, the stretching device being characterized in that it comprises:

a said moving head piece; and a said thrust and retaining piece comprising:
a said rod;
a said lever arm; and
preferably a said baseplate supporting said rod and said lever arm and said thrust piece and said retaining piece.

The stretching device may be supplied in the form of a kit suitable for fitting to any crossbow-type underwater gun, that is not already provided with a stretching device.

BRIEF DESCRIPTION OF THE DRAWINGS

Other characteristics and advantages of the present invention appear in the light of the following detailed description given with reference to the accompanying drawings, in which:

FIG. 4A is a side view of the gun of the invention showing the baseplate supporting the lever arm 10 and the rod 12, with a fragmentary longitudinal section view of the thrust and retaining device;

FIG. 4B is a view in section on AA of FIG. 4A;

FIG. 5A is a side view of an embodiment of said lever arm;

FIG. 5B is a view of the underside of the FIG. 5A lever arm;

FIG. 5C is a section view on BB of FIG. 5A.

DETAILED DESCRIPTION OF THE PREFERRED EMBODIMENT

Figure 1:
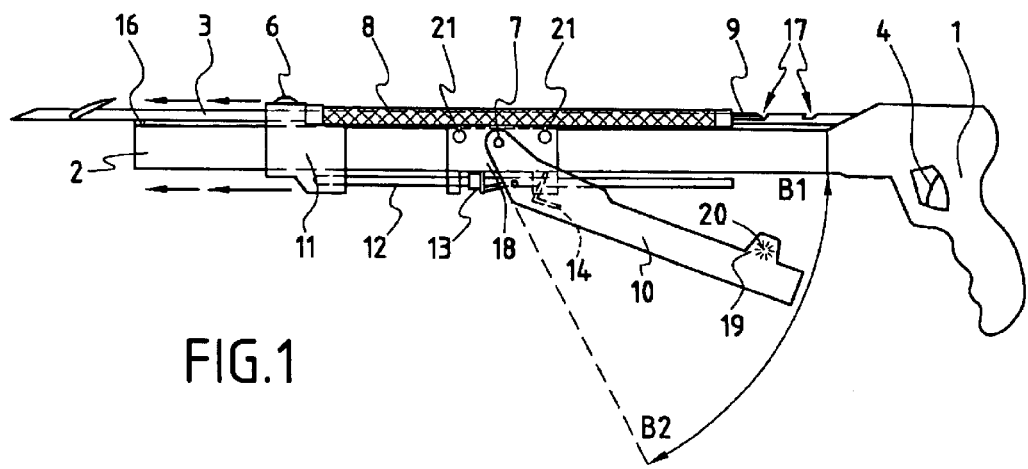
FIGS. 1 to 3 are side views of a gun of the present invention, FIG. 2 showing the gun in the uncocked position, FIG. 3 showing the gun in its cocked position, and FIG. 1 showing it in an intermediate position.
Figure 2:
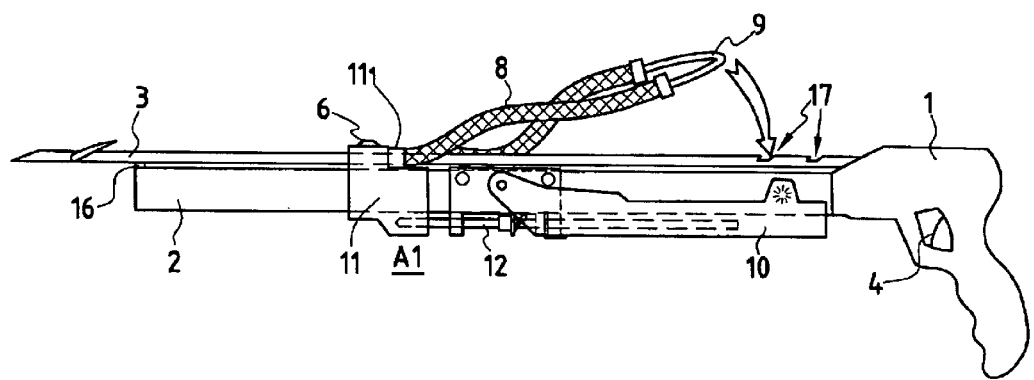
Figure 3:
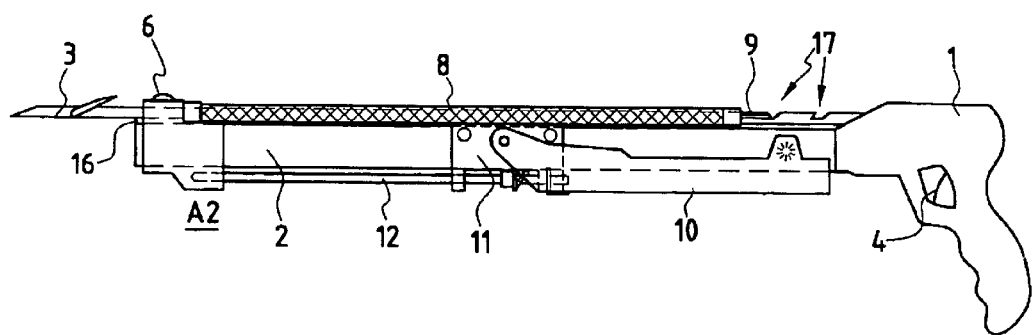
Figure 6A:
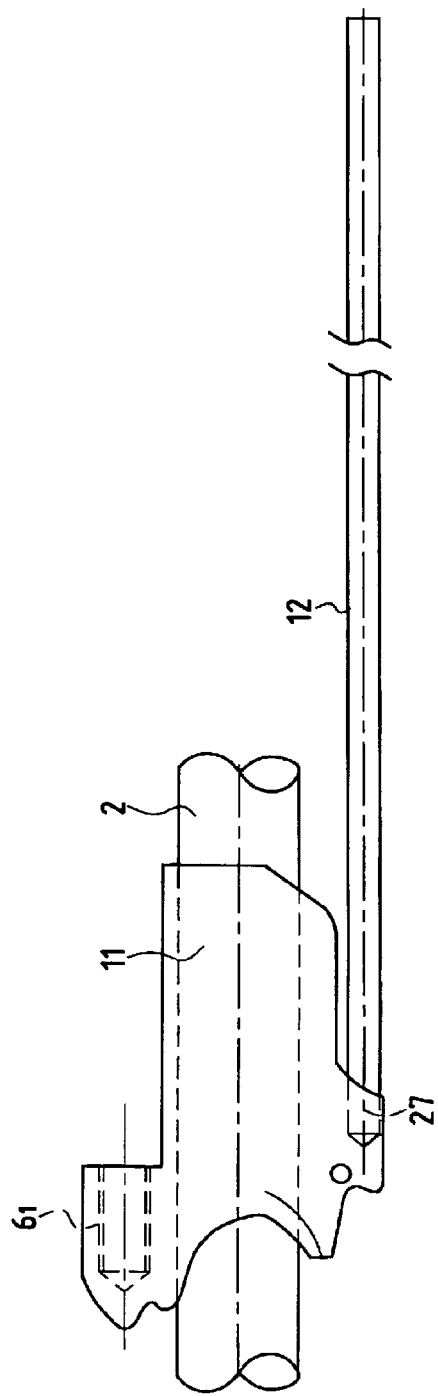
FIG. 6A is a side view of the moving piece 11 in which the moving rod 12 comes into abutment.
Figure 6C:
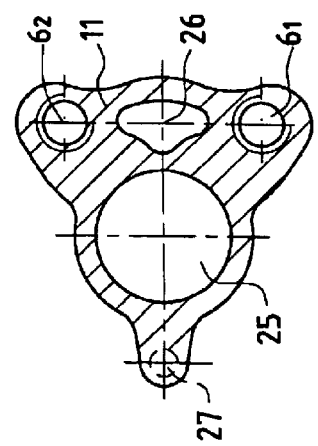
FIG. 6C is a section view of the moving piece 11 in section CC in FIG. 6B.
Figure 6B:
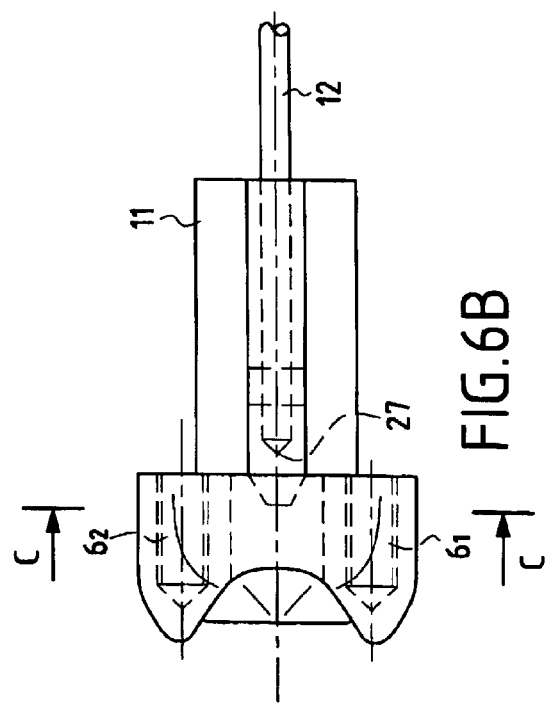
FIG. 6B is a plan view of the moving piece 11 of FIG. 6A.

The crossbow-type underwater gun of the invention comprises a butt 1 with a trigger 4 and a locking mechanism (not shown) integrated in the butt 1 and suitable for retaining the rear end of the spear 3 when it is put into place and engaged in the butt. Said trigger 4 co-operates with said locking mechanism so as to enable the spear to be released and so as to cause it to be propelled when said trigger is actuated. A spear-carrier tube 2 is engaged in said spear butt 1, and the spear is placed on the spear-carrier tube 2.

A moving head piece 11 slides along said spear-carrier tube 2 between a rear position (A1) towards which it comes into abutment against a stationary baseplate 18, and an advanced position (A2) in which it comes into abutment against a front end stop 16 of the spear-carrier tube 2. The moving head piece 11 has a first orifice 25 through which said spear-carrier tube 2 passes. However an embodiment could be provided in which the moving piece 11 slides inside said spear-carrier tube 2. The moving head piece 11 also has a top orifice 26 through which said spear 3 passes, and which acts as guide means therefor.

Two bungee cords 8 placed above and on either side of the spear-carrier tube 2 are fixed at their front ends to first fixing elements $11_2$, $11_1$ which are secured to said moving piece 11, being fixed by screw fastening in hollow side housings $6_1$, $6_2$ thereof. The rear ends of the bungees 8 are connected to each other via a catch element 9 suitable for co-operating with one or more notches 17 in the rear portion of the spear 3.

A loop-forming metal ring 9 connects together the rear ends of the bungees 8. The loop 9 is secured to the rear ends of the bungees 8 by conventional screw cord means.

In order to cock the spear 3 on the gun, the following steps are performed:
1) the moving head piece 1 is moved rearwards (A1) by being caused to slide rearwards until the bungees can be engaged without tension by means of said catch elements 9 penetrating into a said notch 17; and
2) the moving head piece 11 is caused to slide forwards (A2) until the bungees are maximally stretched, with this being done with the help of a series of means acting in combination with the moving piece 11 to constitute a device for stretching the bungees 8.

The device for stretching the bungees 8 comprises, between said moving piece 11, a rod 12 extending parallel to the spear-carrier tube 2 and beneath it in the embodiment shown in the figures, it being understood that said moving rod 12 could be placed inside the spear-carrier 2 if the moving piece 11 is mounted to slide inside said spear-carrier tube 2. The device for stretching the bungees 8 also comprises a lever arm 10. The rod 12 and the lever arm 10 are supported by a stationary baseplate 18 secured to the middle portion of the spear-carrier tube 2. As shown in the figures, the baseplate 18 has a circular orifice through which said spear-carrier tube passes, and a second orifice 29 lower down through which said rod 12 passes.

At one end, the lever arm 10 has two fork branches $10_1$ and $10_2$, said branches $10_1$ and $10_2$ having respective end orifices $7_1$ and $7_2$ through which there passes the horizontal hinge pin 7 of said lever arm. The two branches $10_1$ and $10_2$ of the lever arm 10 are placed astride said baseplate 18 and said horizontal pin 7 passes through said baseplate 18 and said spear-carrier tube 2. The lever arm 10 presents a generally semicylindrical hollow shape as shown in FIG. 5C enabling it to fit closely to the shape of the spear-carrier tube when it is folded against the spear-carrier tube 2 by being pivoted upwards. The lever arm 10 is extended rearwards over a length that varies depending on the model of gun. Its length is also adapted to the variety of tube lengths and depends on the power of the bungees. It can be made longer or shorter depending on the desired maximum force required for cocking the gun.

The baseplate 18 contains a thrust piece 13 comprising a tubular element $13_1$ through which said rod 12 passes, being significantly larger in diameter than the rod 12, so that said tubular element $13_1$ can become off-centered relative to the longitudinal axis of said rod 12. Said thrust piece 13 also has a piece $13_2$ perpendicular to said tubular element $13_1$. Said perpendicular piece $13_2$ is connected to said lever arm 10 via a link 23, such that pivoting said lever arm 10 from a high position (B1) parallel to said spear-carrier tube 2 to a low, thrusted position (B2) that is inclined or vertical relative to said spear-carrier tube 2, blocks said tubular element $13_1$ against said rod 12 and entrains it longitudinally towards the front. The front end of the rod 12 co-operates with a bottom hollow housing 27 in said moving piece 11, causing it to move longitudinally in sliding.

The rod 12 can be secured to the moving piece 11 in said hollow housing 27.

When said lever arm is caused to pivot in the opposite direction from its said low, thrusted position (B2) towards its initial, high position (B1) parallel to said spear-carrier tube 2, said rod 12 comes back onto the axis of said tubular element $13_1$ and can thus return freely to its initial position by moving longitudinally backwards. Said baseplate 18 has a second piece 14 for retaining purposes which is L-shaped, having a first plate $14_1$ and a second plate $14_2$ at right angles to the bottom end of said first plate $14_1$. The top portion of said first plate $14_1$ presents an orifice of diameter that is significantly greater than the diameter of the rod 12 and through which the rod passes, such that said first plate $14_1$ can pivot relative to the axis of the rod 12 under thrust exerted by resilient extender means 24 made of elastomer pushing the top portion of said first plate $14_1$ into its position where it slopes towards the rear end of the gun, thereby blocking the rod 12 inside said orifice of said first plate because of the presence of the resilient extender means 24 which are then in the compressed position and which seek to return to an initial, expanded position by pushing against the top end of said first plate $14_1$, said piece 14 serving to block and retain the rod 12, in particular by preventing it from sliding rearwards in the longitudinal direction when said thrust piece 13 returns to its initial position because of the lever arm pivoting upwards. In contrast, said rod 12 slides longitudinally forwards when said lever arm 10 is pivoted downwards. The forward sliding of said rod 12 compresses the resilient extender means 24, thereby reducing the inclination of said first plate $14_1$ so that the axis of the top orifice of said first plate $14_1$ moves angularly towards the axis of the rod 12 and enables the rod 12 to become unblocked, allowing it to slide forwards. By exerting upward thrust on said second plate $14_2$, said first plate $14_1$ is caused to pivot so as to return into a position for unblocking said rod 12, and by compressing the resilient extender means enables the spear 3 to be uncocked, where necessary.

By moving the moving rod 12 forwards which pushes against the moving piece 11 sliding on the spear-carrier tube 2, the spear is cocked after operating the lever arm 10 several times, each operation causing the rod 12 to advance, with the spear being cocked by a plurality of successive operations on the lever arm.

Said resilient extender means 24 may be replaced by a mechanical system or by a spring.

In the figures, the retaining piece 14 is shown as being behind said thrust piece 13. Nevertheless, in another embodiment, it is possible for them to be the other way round, said retaining piece 14 being in front of said thrust piece 13, and this can make assembly easier.

Locking means enable the lever arm to be secured to the spear-carrier tube 2 when said lever arm 10 is pivoted towards said spear-carrier tube 2. The locking means may be constituted by a snap-fastening device 19, 20 comprising two projections 20 mounted on two side lugs 19 enabling the spear-carrier tube 2 to be snapped between said side lugs 19.

Once the operations of cocking the gun has been completed, and the lever arm 10 is engaged on the tube 2, the bungees 8 are maximally stretched and exert a traction force on the spear 3 along the longitudinal axis in the forward direction. A plurality of notches 17 may be provided along the length of the spear 3 in order to provide a plurality of selectable propulsion forces. Because of the alternating bracing actions of the thrust piece 13 and the retaining piece 14 hinged on the rod 12 in the baseplate 18, the gun can be cocked without using great force, using a single arm on the lever arm 10.

The gun can be uncocked without shooting a spear by releasing the bracing effect of the L-shaped piece 14 by applying upward traction on the second plate 14$_2$.

In a variant embodiment (not shown), the assembly comprising the spear-carrier tube 2 and the stretching device can be covered by a wooden stock: the assembly as received inside the stock is thus hidden which results in an appearance that is more pleasing.

In another variant embodiment (not shown), said moving head piece 11 is fixed on a first element of the spear-carrier tube 2, said spear-carrier tube 2 being made up of one or more concentric tube elements that are slidable in one another, with the outer tube element being said first tube element. In this embodiment, the underwater gun thus presents a telescopic spear-carrier tube.

What is claimed is:

1. A crossbow-type underwater gun comprising:
   a butt having a mechanism for blocking the rear end of a spear and a member for unblocking said spear, preferably a trigger;
   a longitudinal spear support element whose rear end is engaged in said butt, and
   resilient propulsion means comprising at least two bungee type side resilient cords whose front ends are suitable for being fixed to fixing elements and whose rear ends are suitable for engaging in at least one notch in the rear portion of said spear;
   the gun being characterized in that it includes a device for stretching said resilient cords, the device comprising:
      a moving head piece to which said first fixing elements can be fixed, said head piece being suitable for sliding along the front portion of said spear support element between:
         a rear position enabling said resilient cords to be engaged without tension in said notch; and
         an advanced position in which said resilient cords are stretched maximally when they are engaged in said notch;
      a rod, said moving head piece being suitable for sliding along said spear support element by moving said rod in its longitudinal direction, preferably parallel to that of said longitudinal spear support element; and
      a lever arm, said lever arm co-operating with said rod via a thrust and retaining device which makes the following possible:
         moving said rod in said longitudinal direction under drive from pivoting said lever arm;
         holding said rod in an advanced position corresponding to the travel distance of said rod resulting from said pivoting of the lever arm while said lever arm is returned to its initial position by being pivoted in the opposite direction; and
         thereby enabling said resilient cords to be stretched by performing a succession of pivoting operations on said lever arm between an initial position and a thrusted position.

2. A crossbow-type underwater gun according to claim 1, characterized in that said lever arm co-operates with a transverse pivot pin secured to said longitudinal spear support element, thus enabling said lever arm to pivot about said pin between:
   a high initial position in which said arm is preferably substantially parallel to the rear portion of said longitudinal spear support element and beneath it; and
   a low, thrusted position where said lever arm is in an inclined or vertical position.

3. A crossbow-type underwater gun according to claim 1 wherein said thrust and retaining device comprises:
   a thrust piece having an orifice through which said rod passes, the orifice being of diameter substantially larger than the diameter of said rod so that said thrust piece can pivot relative to the axis of said rod between:
      an off-axis, thrust and blocking position in which said thrust piece is secured to said rod and can entrain it forwards in said longitudinal direction under drive from pivoting said lever arm; and
      a return position in which said rod lies on the axis of said first orifice, and said thrust piece can thus return freely to its initial position by moving rearwards in translation in said longitudinal direction;
   a retaining piece including an orifice through which said rod passes, the orifice being substantially larger in diameter than said rod such that said retaining piece can pivot relative to the axis of the rod between:
      an off-axis, retaining and blocking position in which said retaining piece blocks the rod by preventing it from sliding rearwards in said longitudinal direction; and
      an unblocking position in which said rod can slide freely in said longitudinal direction; and
   said retaining piece being held in said retaining and blocking position while said thrust piece is in its return position, and said retaining piece being held in said unblocking position while said rod is sliding forwards in said longitudinal direction.

4. A crossbow-type underwater gun according to claim 3, wherein said retaining piece is held in its said retaining position by resilient extender return means, preferably made of elastomer material, suitable for being compressed by pivoting of said retaining piece towards said unblocking position.

5. A crossbow-type underwater gun according to claim 4, wherein said retaining piece is L-shaped having a first plate and a second plate forming a right angle at the bottom end of said first plate
   said orifice of said retaining piece being in the top portion of said first plate;
   said resilient extender return means being in annular form around said rod in extension between a stationary stop element and said first plate;
   said resilient return means exerting thrust on said first plate, pushing it into an inclined position corresponding to said retaining position as obtained by blocking said retaining piece, the top end of said first plate preferably being inclined towards the rear of said gun; and
   said first plate being capable of being pivoted towards said unblocking position for unblocking said retaining piece by moving said rod forwards in said longitudinal direction and by pivoting said second plate, preferably upwards, causing said resilient return means to be compressed in both cases so that said spear can be uncocked by exerting upward pressure using a finger on said second plate.

6. A crossbow-type underwater gun according to claim 1 wherein:

said lever arm co-operates with a traverse pivot pin secured to said longitudinal spear support element, thus enabling said lever arm to pivot about said pin between a high initial position in which said arm is preferably substantially parallel to the rear portion of said longitudinal spear support element and beneath it and a low, thrusted position where said lever arm is in an inclined or vertical position, said lever arm is secured to said thrust piece, by means of a link in such a manner that pivoting said lever arm causes said thrust piece to pivot, said thrust piece occupying said off-axis blocking position when said lever arm pivots from its said initial position towards its said thrusted position; and said return position when said lever arm pivots in the opposite direction from its said thrusted position towards its said initial position.

7. A crossbow-type underwater gun according to claim 1, including a stationary baseplate secured to said longitudinal spear support element, said baseplate supporting said transverse pivot pin of said lever arm and the various component parts of said thrust and retaining device.

8. A crossbow-type underwater gun according to claim 7, wherein said baseplate comprises at least one, and preferably at least two bottom orifice(s) through which said rod passes, and also preferably at least one top orifice through which said longitudinal spear support element constituting a spear-carrier tube passes.

9. A crossbow-type underwater gun according to claim 1, wherein said moving head piece has a first orifice through which said spear support element passes and a second orifice through which said spear passes and which serves as guide means therefor, and a hollow housing in which said rod comes into abutment to cause said moving head piece to slide forwards.

* * * * *